Patented Nov. 25, 1924.

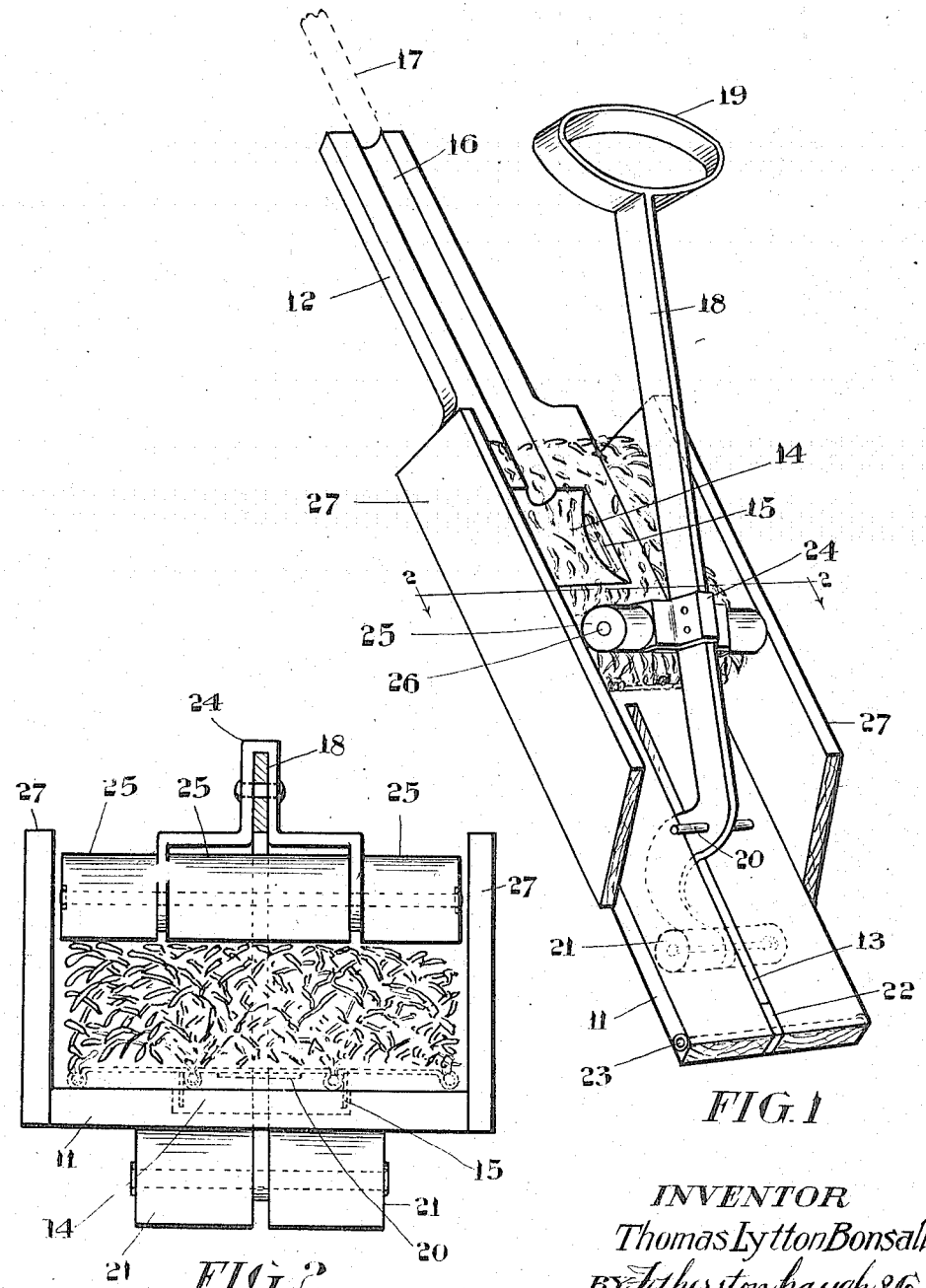

1,517,187

UNITED STATES PATENT OFFICE.

THOMAS L. BONSALL, OF MONTREAL, QUEBEC, CANADA.

MOP WRINGER.

Application filed December 13, 1922. Serial No. 606,679.

*To all whom it may concern:*

Be it known that I, THOMAS L. BONSALL, a subject of the King of Great Britain, and resident of the city of Montreal, in the Province of Quebec and Dominion of Canada, have invented certain new and useful Improvements in Mop Wringers, of which the following is a full, clear, and exact description.

This invention relates to new and useful improvements in mop wringers and the object of the invention is to provide a simple and efficient device for wringing flat mops.

Another object is to provide a device which will be cheaply and easily manufactured.

In my invention, I provide a base board of channel shape to return the liquid extracted from a wet mop to a pail or the like. In the bottom board, a slot is cut through which a lever is placed, with a handle at one end and guide rollers at the other. A pin is placed through the lever to hold it in position. Midway between the handle and the pin a set of drying rollers is rotatably mounted in a bracket, which is secured to the lever by a suitable fastening. A recess is provided in the bottom board and is adapted to hold the mop in position during the drying operation. The device is worked between the guide rollers and the drying rollers and thus provides a very simple and easily worked mechanism for wringing flat mops.

In the drawings;—

Fig. 1 is a perspective view of the device with a mop shown in dotted lines in the channel portion.

Fig. 2 is a cross sectional elevation of the device taken on the line 2—2, Figure 1.

Referring more particularly to the drawings, 11 designates a bottom board which is shaped at one end to provide a means 12 for holding the device and at the other a slot 13 is cut. The board is provided with a recess 14 for the handle swivelling mechanism of the mop 15 and a groove 16 for the handle 17 of the mop. The recess and slot are for holding the mop against movement during the operation of drying. A lever 18, which is bent at one end to form a handle 19 and at the other end is bent to form an S shape, having a pin 20 at one end of the S and guide rollers 21 at the other or extreme tail end of the lever, is positioned in the slot 13 of the board 11. The guide rollers 21 are positioned a short distance from the pin and at the extreme end of the lever and, on the other side of the board from the pin. The end of the slot is closed by a distance piece 22 held in position by the bolt, rivet or the like 23 to keep the lever in the said slot. Approximately midway between the pin 20 and the handle 19 is a bracket 24, which is riveted or otherwise secured to the lever and adapted to hold the drying rollers 25, which are rotatably mounted on a spindle 26 passing through the bracket. To prevent the fluid extracted from the wet mop from falling on the floor and also to guide the said fluid into a pail, bucket or the like, the bottom board is shaped in the form of a channel formed by nailing or otherwise securing the side boards 27 to the board and extending them upwardly from the recessed side of same. This forms a chute or channel to return water or the like to the pail or other vessel in which the device may be placed.

The operation of the device is as follows:—

The device is inserted in a pail or the like, with the holding means upwards, the pail being partially filled with a washing fluid. The handle is raised and the mop is placed in the channel portion of the device and dipped in the fluid. The mop is then withdrawn and so positioned that it is held in position by means of the recesses cut in the bottom board. The fibre side of the mop is turned upwardly. The lever, which is slidably mounted in the groove, is then pulled upwardly towards the holding means and the drying rollers pressed against the fibres to dry them. During this operation, the guide rollers engage with the under side of the board and thus provide a roller bearing easy to manipulate during the operation of drying. By exerting a downward pressure on the handle, the drying rollers are pressed against the fibres, the fluid extracted from the fibres and returned by means of the chute to the pail or the like through the medium of the channel provided for that purpose.

In the drawings I have shown my preferred construction, in which the bottom board is made of wood, which is cheaply and easily manufactured, but a metal, recessed, grooved channel-way may be provided without departing from the spirit of the invention. I also show the guide roller end of the lever bent to form an S, but this part of the lever and also the handle may be also modified.

Having thus described my invention, what I claim is:—

1. A mop wringer comprising a mop support, a traveling lever provided with fulcrum means engageable with said support, guide rollers carried by the lever for engaging the bottom of the support and pressure applying rollers carried by the lever adapted to travel over the support and to engage the mop positioned thereon.

2. A mop wringer comprising a mop support, a lever mounted for traveling movement with respect to said support, guide rollers carried by the lever positioned to engage the bottom of the support and pressure applying rollers carried by the lever positioned to travel over the top of the support and to engage a mop positioned thereon.

3. A mop wringer comprising a mop support, a lever mounted to travel in a slot formed in said support, guide rollers carried by the lever for engaging the bottom of the support, and pressure applying rollers carried by the lever adapted to travel over the support and to engage a mop positioned thereon.

4. A mop wringer comprising a mop support, a hand lever mounted to travel in a slot formed in said support, rollers on said lever positioned to engage the bottom of the support, a fulcrum carried by the lever engageable with the mop engaging surface of the support to provide for swinging movement of said lever with respect to the support, and pressure rollers carried by the lever arranged to travel over a mop positioned on the support.

5. A mop wringer comprising a mop support of channel form provided with mop positioning recesses, a hand lever mounted to travel in a slot formed in said support, guide rollers positioned at one end of said lever to engage the bottom surface of the support, a pin fixed to the intermediate portion of the lever to engage the mop supporting surface of the support, and pressure applying rollers carried by the lever positioned between the said pin and the remaining end of the lever and adapted to engage a mop arranged on the support.

6. A device according to claim 5 in which the slot is closed at both ends to keep the hand lever in position.

In witness whereof I have hereunto set my hand.

THOMAS L. BONSALL.